(12) United States Patent
Kobayashi

(10) Patent No.: US 7,190,497 B2
(45) Date of Patent: Mar. 13, 2007

(54) SCANNING TYPE IMAGE DISPLAY OPTICAL SYSTEM, SCANNING TYPE IMAGE DISPLAY APPARATUS, AND IMAGE DISPLAY SYSTEM

(75) Inventor: Shuichi Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 10/963,486

(22) Filed: Oct. 12, 2004

(65) Prior Publication Data

US 2005/0041275 A1    Feb. 24, 2005

Related U.S. Application Data

(62) Division of application No. 10/236,444, filed on Sep. 5, 2002, now Pat. No. 6,822,773.

(30) Foreign Application Priority Data

Sep. 7, 2001   (JP) .............................. 2001-272509

(51) Int. Cl.
*G02B 26/08* (2006.01)
*G09G 3/00* (2006.01)
(52) U.S. Cl. ...................... 359/196; 359/197; 359/202; 359/631; 345/32
(58) Field of Classification Search ...................... None
See application file for complete search history.

(56) References Cited

U.S. PATENT DOCUMENTS

| 5,467,544 | A | 11/1995 | Treuberg |
| 5,701,132 | A | 12/1997 | Kollin et al. |
| 5,757,544 | A | 5/1998 | Tabata et al. |
| 6,281,862 | B1 * | 8/2001 | Tidwell et al. ................. 345/32 |

FOREIGN PATENT DOCUMENTS

| JP | 7-509326 A | 10/1995 |
| JP | 2000-111829 | 4/2000 |
| JP | 2000-111829 A | 4/2000 |
| JP | 2001-027738 A | 1/2001 |
| WO | 94/27177 A1 | 11/1994 |

OTHER PUBLICATIONS

Japanese Office Action of corresponding Japanese Patent Application No. 2001-272509 dated Feb. 21, 2006 (3 pages) and partial English translation (1 page).

* cited by examiner

*Primary Examiner*—James Phan
(74) *Attorney, Agent, or Firm*—Morgan & Finnegan, LLP

(57) ABSTRACT

A scanning type image display optical system of the present invention comprises: a reflecting surface; an optical scanning unit which forms a two-dimensional image on the reflecting surface by light scanning; and an ocular optical system which leads light from the two-dimensional image formed on the reflecting surface to an observer.

5 Claims, 9 Drawing Sheets

SCANNING TYPE IMAGE DISPLAY OPTICAL SYSTEM, SCANNING TYPE IMAGE DISPLAY APPARATUS, AND IMAGE DISPLAY SYSTEM

This application is a DIV of application Ser. No. 10/236,444 filed Sep. 5, 2002, U.S. Pat. No. 6,822,773.

BACKGROUND OF THE INVENTION

1. Field of the Invention

The present invention relates to a scanning type image display optical system comprising an optical scanning unit which forms a two-dimensional image by light scanning and a scanning type image display apparatus.

2. Description of the Related Art

With the advancement in the performance of the semiconductor technology, the data communications environment has also become more sophisticated, and portable information terminals have progressed rapidly. In such a situation, an ever-greater advanced display of information by portable information terminals has been demanded, and an improvement in display resolution of portable information terminals has been demanded, therefore, head mounted displays (HMDs) have come to receive great attention.

Most of the current HMDs are constructed such that a transmission type liquid crystal display is used as an image display element and images displayed on the liquid crystal display are observed by an observer as a virtual image through an ocular optical system.

A transmission type liquid crystal display is illuminated by a back illuminating optical system such as a fluorescent tube, however, transmittance of the liquid crystal display is on the order of several percent and utilization efficiency of light is very low. Therefore, power consumption is great and for use as a display unit of a portable information terminal, utilization efficiency of light must be improved.

On the other hand, techniques relating to a display apparatus using no such two-dimensional image display element as a liquid crystal display have been disclosed and suggested in U.S. Pat. No. 5,467,104, Japanese Laid-Open Patent Publication No. 2000-111829, etc. U.S. Pat. No. 5,467,104 has disclosed a technique for forming an image directly on a retina via an optical system by scanning of R (red), G (green), and B (blue) light in the horizontal direction and vertical direction.

In addition, in Japanese Laid-Open Patent Publication No. 2000-111829, a scanning type image display apparatus which uses a beam from a beam source for two-dimensional scanning and leads the beam into an eyeball via an integrated reflecting member disposed in front of the wearer's (observer's) eye.

However, in the scanning type image display apparatus disclosed in the above U.S. Pat. No. 5,467,104, since it is required that light scanning is performed at a very high speed, a very small-sized device is used for a light scanning part constituted by a mirror or the like. Accordingly, a beam used for scanning becomes extremely thin, thus the diameter of the beam at the observer's pupil position becomes very small.

As a method for expanding such a small exit pupil diameter, techniques disclosed in U.S. Pat. No. 5,701,132 and U.S. Pat. No. 5,757,544 exist. In U.S. Pat. No. 5,701,132, by transmitting a scanning beam which has formed an intermediate image having a curvature through expanding members such as a lens array and a diffusion plate, the divergence angle of rays after transmission through the expanding member is expanded.

In addition, in U.S. Pat. No. 5,757,544, although this image display apparatus is not a scanning type, by transmitting, through a diffusing plate, light after being made incident into an image display element such as an LCD (liquid crystal display) illuminated by parallel light rays, the exit pupil is similarly expanded.

However, in these constructions disclosed in US patents, since the transmission-type exit pupil expanding members are used, the optical path becomes long, resulting in a large-sized apparatus.

SUMMARY OF THE INVENTION

A scanning type image display optical system of the present invention comprises: a reflecting surface; an optical scanning unit which forms a two-dimensional image on the reflecting surface by light scanning; and an ocular optical system which leads light from the two-dimensional image formed on the reflecting surface to an observer.

The features of a scanning type image display optical system, a scanning type image display apparatus, and an image display system of the present invention will be more fully revealed from the following detailed description of embodiments by reference to the drawings.

DETAILED DESCRIPTION OF THE PREFERRED EMBODIMENTS

Hereinafter, preferred embodiments of the invention will be described in detail with reference to the drawings.

Figure 1:
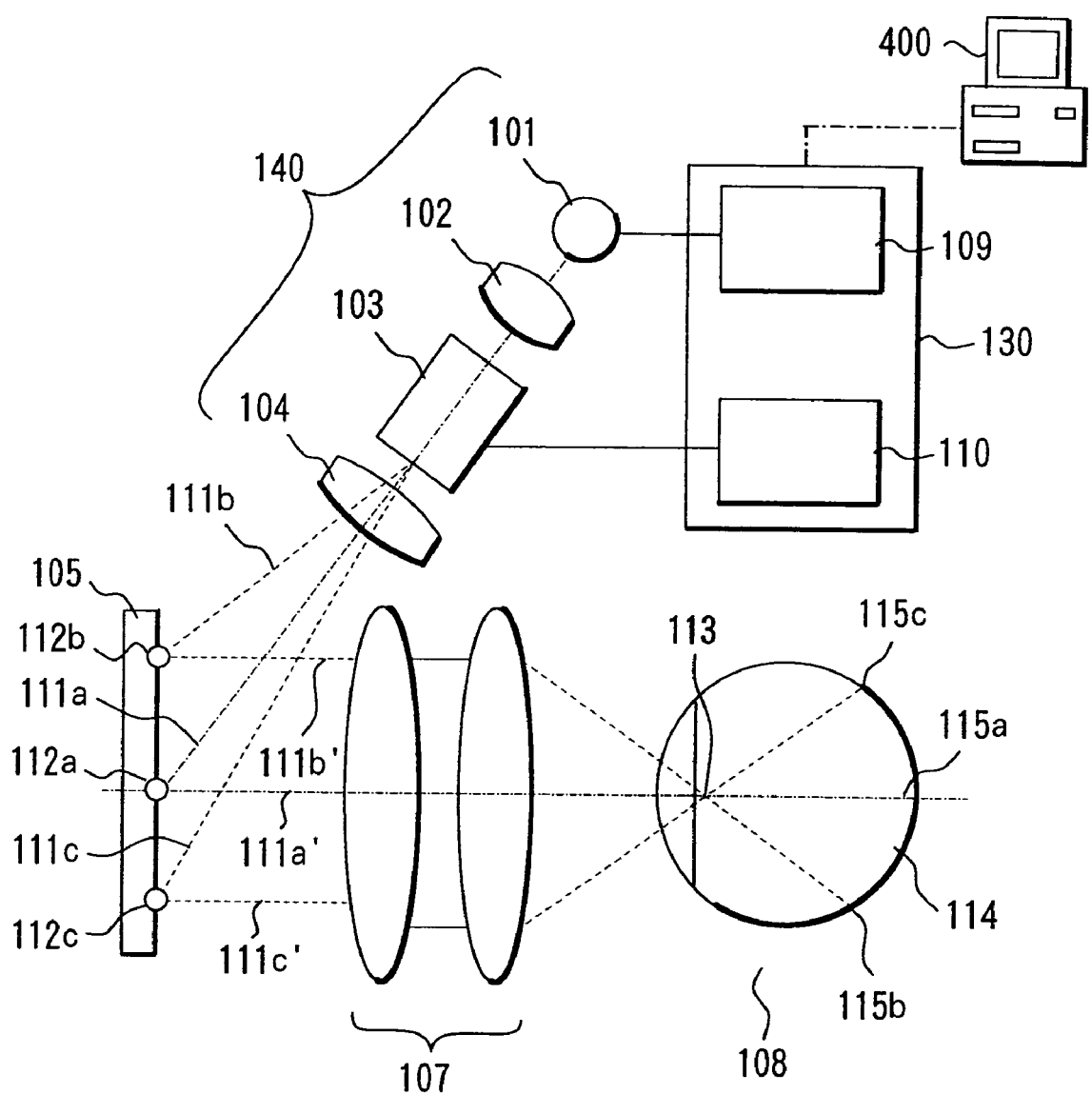
FIG. 1 is a diagram showing a construction of a scanning type image display optical system of an HMD as an embodiment of the present invention.

FIG. 1 shows a sectional view of a scanning type image display optical system used in a head mounted display (a scanning type image display apparatus) as an embodiment of the present invention. In this drawing, a light source 101 is connected to a light source control circuit 109 and modulates response to an image signal as a base of an image to be displayed.

In addition, in the light source control circuit 109, an image signal from an image providing apparatus 400 such as a personal computer, a video player, or a DVD player are to be inputted, and the head mounted display and the image providing apparatus 400 compose an image display system.

The light source control circuit 109 drives the light source 101 in response to the image signal from the image providing apparatus 400 and causes the light source 101 to emit a modulated beam. Namely, in the present embodiment, beam to be emitted from the light source 101 is directly modulated.

The beam from the light source 101 is made incident into an optical scanning unit 103 via a first optical system 102. The optical scanning unit 103 is connected to a scanning control circuit 110 and is controlled synchronously with the light source 101. This optical scanning unit 103 is capable of deflecting the incident beam into a two-dimensional direction. Herein, in FIG. 1, 111$a$, 111$b$, and 111$c$ denote examples of beam which is scanned by the optical scanning unit 103. The light source control circuit 109 and the scanning control circuit 110 compose a control part 130.

The beam scanned by the optical scanning unit 103 is condensed at respective arrival points on a reflecting member 105 via a second optical system 104. By scanning the modulated beam from the light source 101, a two-dimensional image is formed on a reflecting surface of the reflecting member 105. The light source 101, the first and second optical systems 102 and 104, and the optical scanning unit 103 compose a scanning optics 140.

The reflecting member 105 is composed of a screen or the like and reflects, irrespective of the incident positions, the beams 111$a$, 111$b$, and 111$c$ made incident upon its reflecting surface in the direction shown with 111$a'$, 111$b'$, and 111$c'$, that is, in the direction toward an ocular optical system 107.

The reflected beams 111$a'$, 111$b'$, and 111$c'$ are made incident, via the ocular optical system 107, into a pupil 113 of an observer's eye 108.

Figure 2:
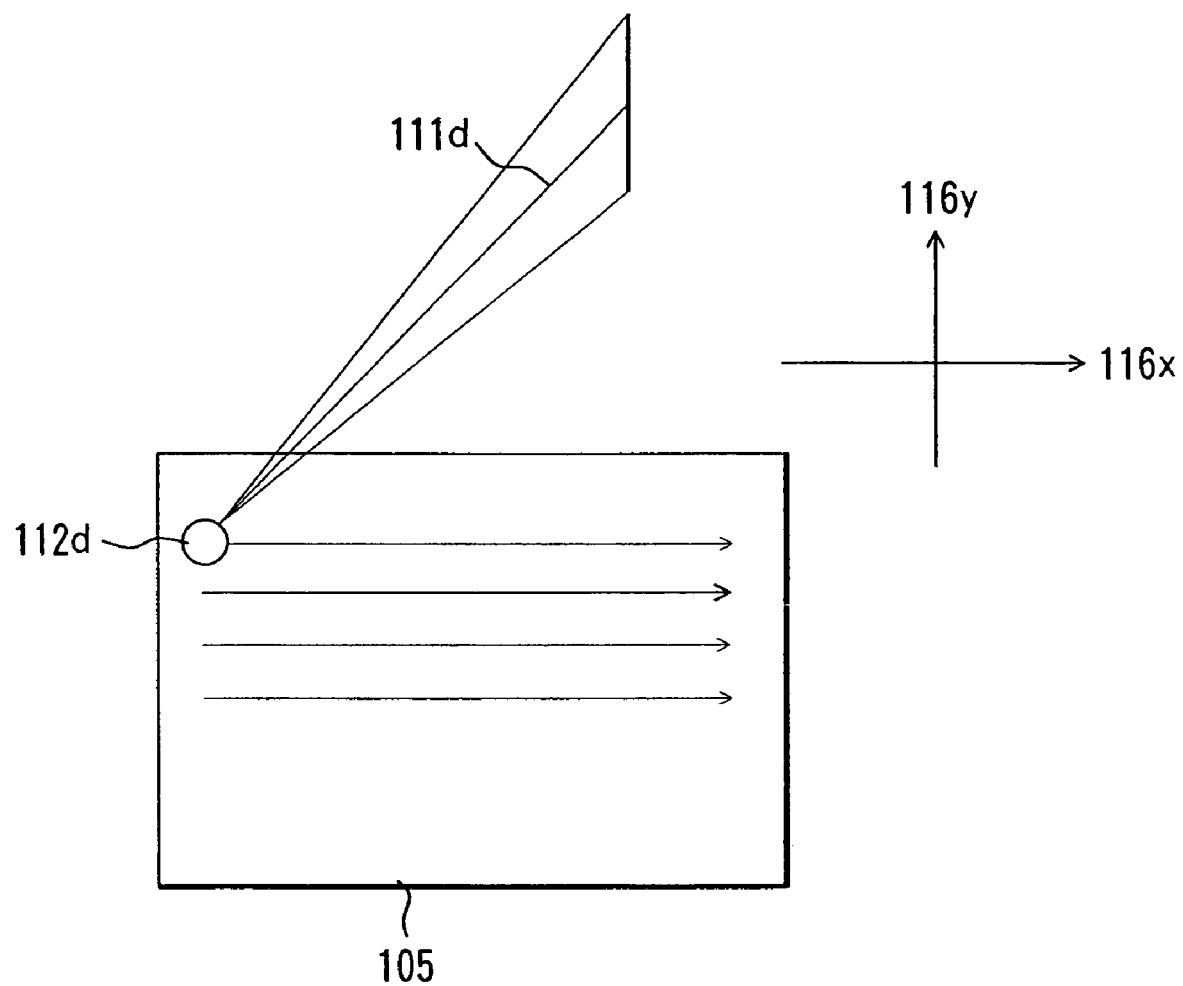
FIG. 2 is a diagram for explaining a scan image of the scanning type image display optical system shown in FIG. 1.

The beams are made incident into the pupil 113 of the observer form, on a retina 114 of the eye 108, images 115$a$, 115$b$, and 115$c$ corresponding to condensing points 112$a$, 112$b$, and 112$c$ on the reflecting member 105. As a result, the it can be observed, via the ocular optical system 107, a two-dimensional scanned image formed on the reflecting member 105. FIG. 2 shows a scanning example; raster scan, for forming a two-dimensional image on the reflecting member 105 by the scanning optics 140. In this drawing, a beam 111$d$ represents a beam which is scanned by the optical scanning unit 103, furthermore exits from the second optical system 104, and is then condensed on the reflecting member 105, and a point 112$d$ shows its condensing point.

The optical scanning unit 103 (unillustrated in FIG. 2) is capable of scan-driving in a first direction and a second direction perpendicular thereto and the condensing point 112$d$ on the reflecting member 105 is scanned in a direction 116$x$ corresponding to the above first direction and a direction 116$y$ corresponding to the above second direction.

Figure 3:
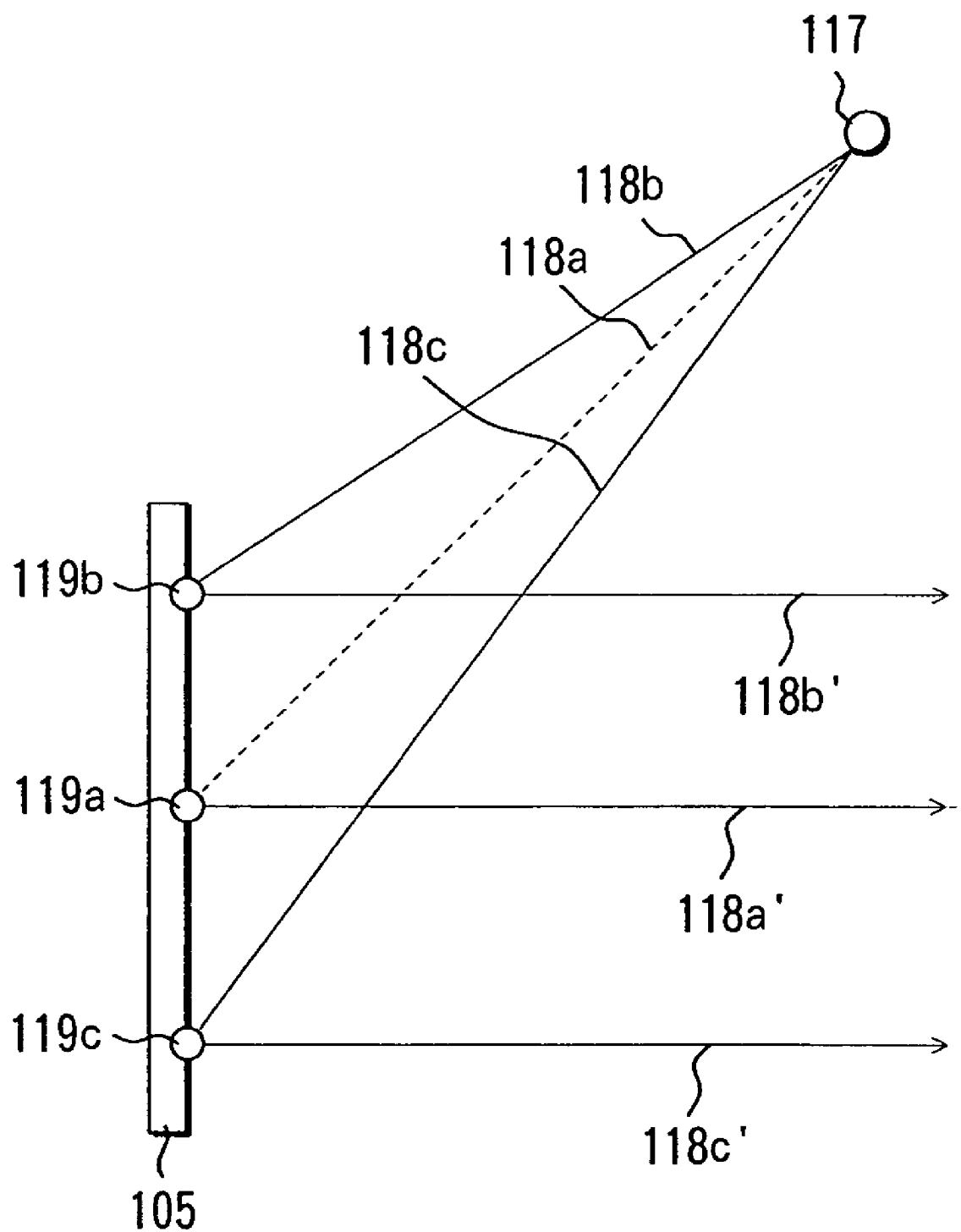
FIG. 3 is a diagram showing deflection characteristics of a reflecting member of the scanning type image display optical system shown in FIG. 1.

In the present embodiment, as shown in FIG. 1, the optical scanning unit 103 is constructed so as to scan beam from an oblique direction with respect to the reflecting member 105. In FIG. 3, deflection characteristics of the reflecting member 105 are shown. Herein, in FIG. 3, deflection characteristics of the reflecting member 105 in terms of a section thereof are shown.

118$a$, 118$b$, and 118$c$ denote principal rays of beam scanned by the scanning optics 140 at certain times, respectively. Herein, the principal rays 118$a$, 118$b$, and 118$c$ are rays that have been exited from an apparent scanning point 117.

Owing to a condensing action of the second optical system 104, the beams including the respective principal rays 118$a$, 118$b$, and 118$c$ form condensing points 119$a$, 119$b$, and 119$c$ substantially on the reflecting surface (or in the vicinity of the reflecting surface) of the reflecting member 105 and are reflected by the reflecting member 105 and deflected so as to become reflected including rays 118$a'$, 118$b'$ and 118$c'$, respectively.

The respective points on the reflecting surface of the reflecting member 105 have an action to deflect the beams so that the principal rays 118$a'$, 118$b'$ and 118$c'$ reflected on the reflecting member 105 become approximately parallel to each other and are made incident into the ocular optical system 107 (unillustrated in FIG. 3). In detail, the directions of normal lines of the reflecting surface at the respective points differ from each other.

Figure 4:
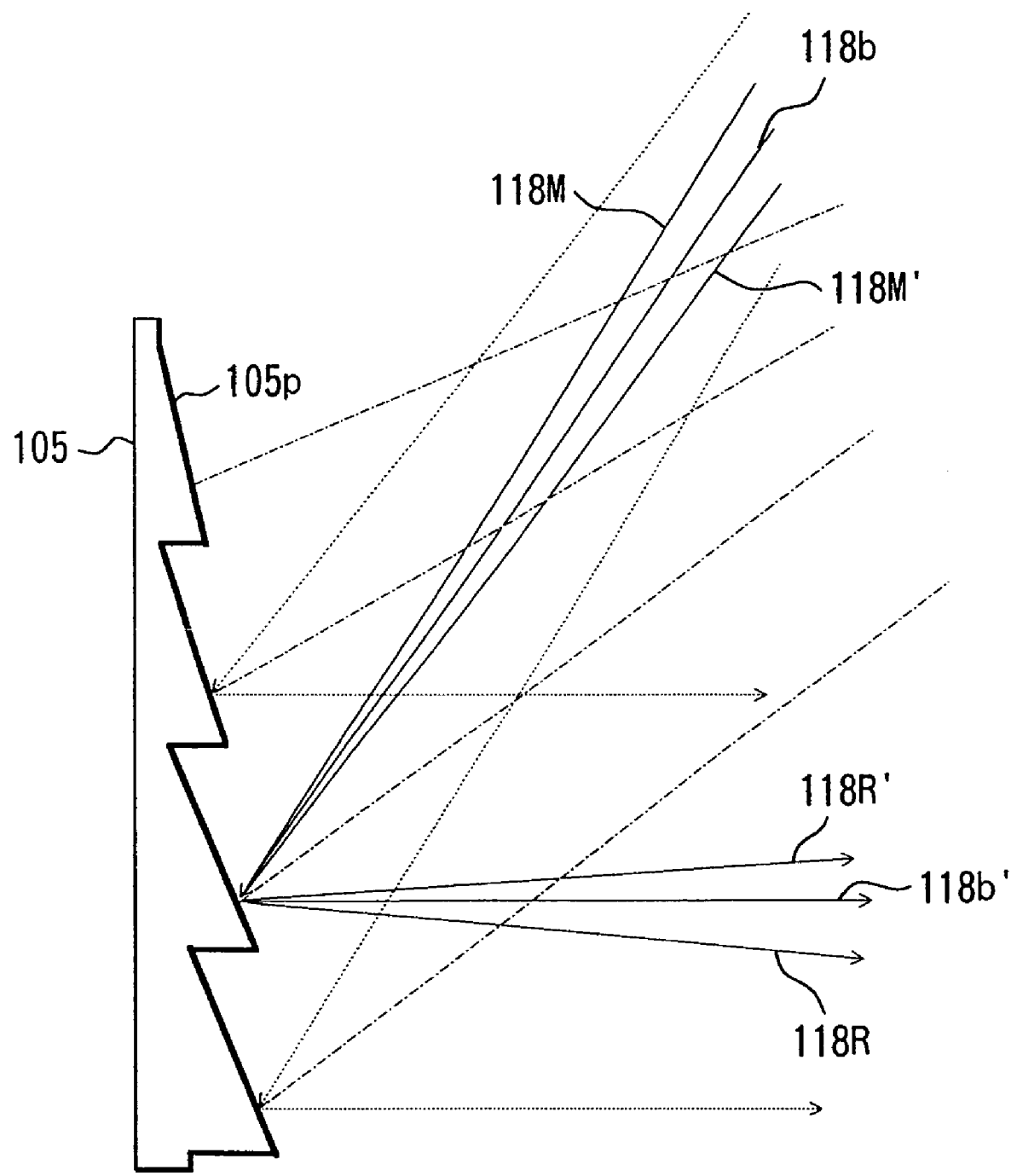
FIG. 4 is a diagram showing deflection characteristics of the reflecting member shown in FIG. 3.

FIG. 4 shows a detailed construction example for providing such a deflection action. In this drawing, reflective Fresnel lens-like multiple minute reflecting plates 105$p$ are formed on the reflecting member 105. The directions of normal lines (shown by alternate long and short dash lines) of the reflecting surfaces of these minute reflecting plates 105$p$ differ depending on the positions of the minute reflecting plates 105$p$ on the reflecting member 105.

By this construction, at the respective points located on the reflecting member 105, most of the rays which have been made incident can be deflected into a desirable direction, namely, in a direction for incidence into the ocular optical system 107 (unillustrated in FIG. 4).

The reflected rays 118$a'$, 118$b'$, and 118$c'$ (in FIG. 1) are, for the ocular optical system 107, principal rays which form respective image points. In actuality, as shown in FIG. 4, marginal rays 118M and 118M' exist around the principal ray 118$b$, however, in the present embodiment, by the first and second optical systems 102 and 104, the principal ray 118$b$ and marginal rays 118M and 118M' are condensed substantially on the reflecting surface of the reflecting member 105 as shown in FIG. 4.

Then, the principal ray 118$b$ reflected on the reflecting member 105 reflects as shown by 118$b'$. Furthermore, its marginal rays 118M and 118M' reflect as shown by 118R and 118R'.

Figure 5:
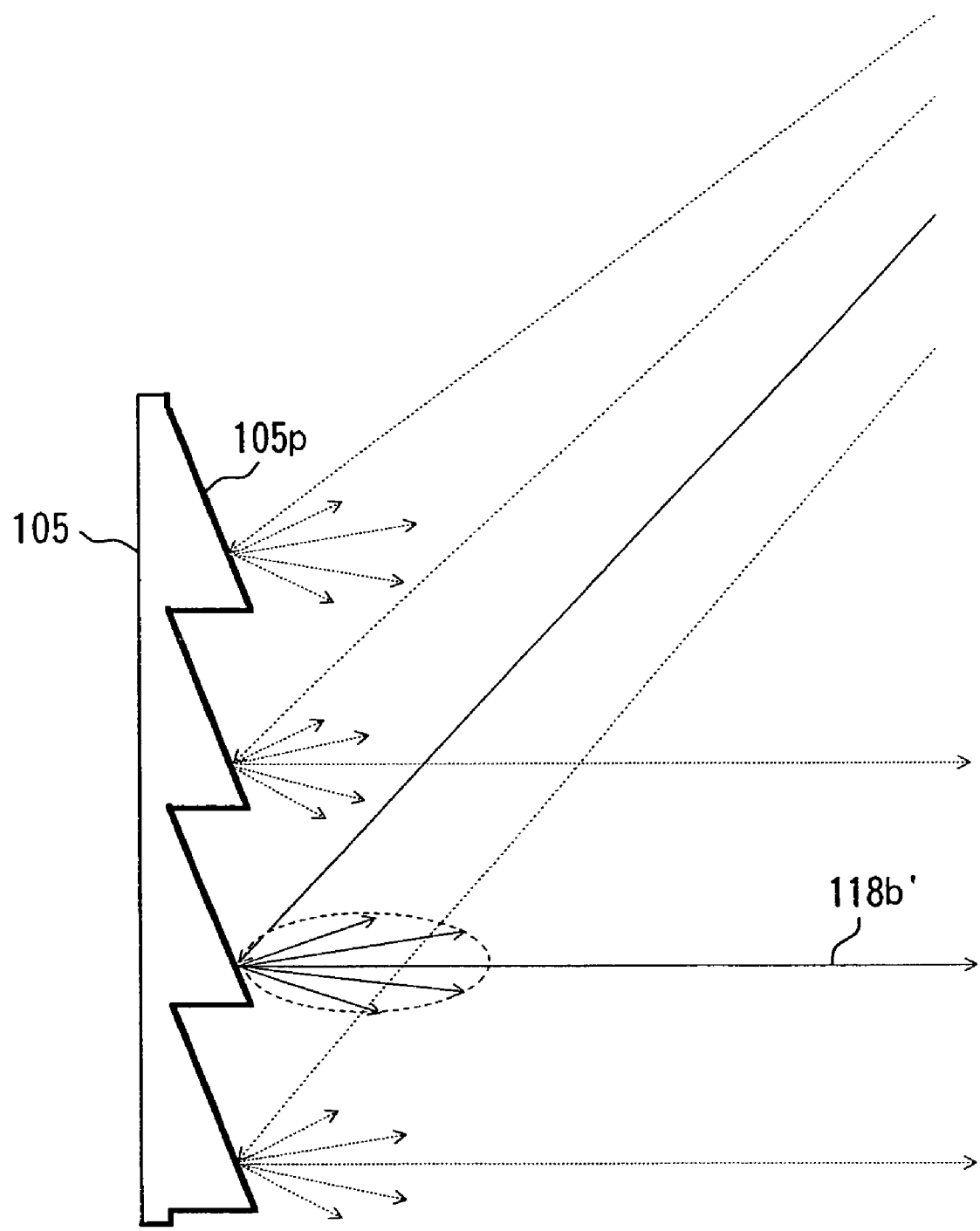
FIG. 5 is a diagram showing diffusion characteristics of the reflecting member shown in FIG. 3.

FIG. 5 is a diagram where surface characteristics of the minute reflecting plates 105$p$ are illustrated. In the present embodiment, a structure for exerting a diffusing action is provided for the surface of each minute reflecting plate 105$p$. Therefore, a beam made incident upon each minute reflecting plate 105$p$ reflects toward the ocular optical system 107 (unillustrated in this figure), as mentioned above, and also diffuses and expands to an extent not to depart from the ocular optical system 107. Accordingly, the exit pupil can be expanded via the ocular optical system 107.

Furthermore, expression of the diffusing action on the reflecting member 105 can be realized by a diffusing structure having a minute uneven shape, a diffraction grating structure or the like. Even if a diffusing action is given to the reflecting member 105, since the scanning beam is condensed substantially on the reflecting surface of the reflecting member 105, little deterioration in resolution occurs.

According to the construction as in the above, by folding the optical path by the reflecting member 105, an image display optical system which is, while being a scanning type, small in size, moreover, can expand a pupil, and furthermore, has high resolution, can be realized.

In addition, a construction for leading the scanned beam to an observer's eye by means of an integrated reflecting plate such as a minute Fresnel lens or the like has been disclosed in Japanese Laid-Open Patent Publication No. 2000-111829, as well. However, since no two-dimensional image is formed on the integrated reflecting plate disclosed in this publication, this is completely different in function from the reflecting member 105 of the present embodiment. In the present embodiment, a description has been given for a case where a reflective Fresnel lens is used as the reflecting member 105 having minute reflecting structures, however, a reflecting member used in the present invention is not limited hereto.

In addition, in the present embodiment, a description has been given for a case where the two-dimensional scan mode to be carried out by the optical scanning unit 103 is provided as a so-called raster scanning as shown in FIG. 2, however, an optical scanning unit used in the present invention is not limited hereto and any construction is satisfactory as long as a two-dimensional image formed by an optical scanning unit is led by a reflecting member to an ocular optical system is satisfactory.

As the optical scanning unit, an optical scanning unit which is the same in construction as ones mentioned as prior arts, a polygon mirror, a galvano mirror or the like can be used.

Furthermore, in the present embodiment, a description has been given for a case where a single light source is provided, however, a plurality of light sources may be provided, and furthermore, light sources of a plurality of colors such as red, blue, and green may also be used so that a color image can be displayed.

Figure 6:
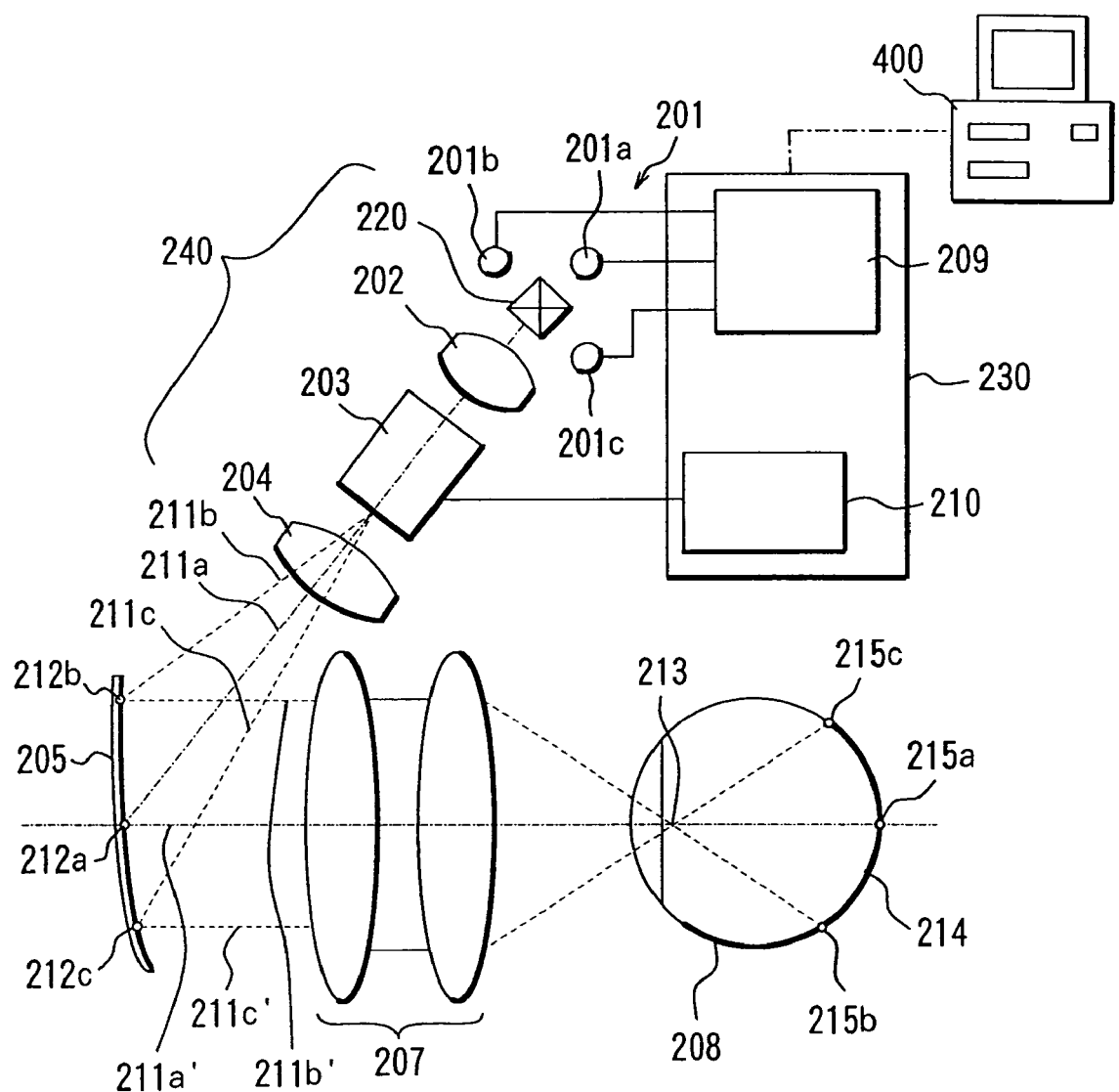
FIG. 6 is a diagram showing a construction of a scanning type image display optical system of an HMD as another embodiment of the present invention.

FIG. 6 shows a sectional view of a scanning type image display optical system used in a head mounted display (a scanning type image display apparatus) as another embodiment of the present invention.

In the abovementioned embodiment shown in FIG. 1 through FIG. 5, a description has been given for a case where the reflecting member 105 is a flat plate (multiple minute reflecting plates which are different in the directions of normal lines are provided on the surface of the flat plate), however, in the present embodiment, the reflecting member has a curvature. In addition, in the present embodiment, a plurality of light sources are provided. Herein, the basic construction is the same as that of the embodiment shown in FIG. 1 through FIG. 5, wherein by scanning condensing points by an optical scanning unit, a two-dimensional image is formed on a reflecting member, and this image is observed by an observer via an ocular optical system.

In FIG. 6, a light source unit 201 is composed of light sources 201a, 201b, and 201c of a plurality of colors, which are respectively connected to a light source control circuit 209 and modulate emitting beams in response to image signals as bases of an image to be displayed. Such a plurality of light sources 201a, 201b, and 201c are semiconductor light sources of red, blue, and green, respectively.

Similar to the embodiment shown in FIG. 1 through FIG. 5, in the light source control circuit 209, image signals from an image providing apparatus 400 are inputted, and the light source control circuit 209 drives the light sources 201a, 201b and 201c in response to the image signals and causes the light sources 201a, 201b and 201c to emit modulated beams. Namely, in the present embodiment, beams to be emitted from the light sources 201a, 201b and 201c are directly modulated.

The beams of the respective colors from the light sources 201a, 201b and 201c are composed as one beam by a color-composing element 220 such as a dichroic prism. The color-composed beam is made incident into an optical scanning unit 203 via a first optical system 202.

The optical scanning unit 203 is connected to a scanning control circuit 210 and is controlled synchronously with the light sources 201a, 201b and 201c. This optical scanning unit 203 is capable of deflecting the incident beam into a two-dimensional direction. The light sources 201, the color-composing element 220 and, the first and the second optical systems 202 and 204, and the optical scanning unit 203 compose the scanning optics 240. And the light source control circuit 209 and the scanning control element 210 compose a control part 230.

In the drawing, 211a, 211b, and 211c denote examples of beams scanned by the optical scanning unit 203, which are condensed at respective arrival points 212a, 212b, and 212c on a reflecting member 205 via a second optical system 204. By color-composing of the modulated beams of the respective colors from the light sources 201a, 201b and 201c and scanning the color-composed beam, a two-dimensional full-color-image is formed on the reflecting member 205.

The reflecting member 205 reflects, by means of its reflecting surface, the incident beams 211a, 211b, and 211c, irrespective of the incident positions, in the direction shown with 211a', 211b', and 211c'. The reflected beams 211a', 211b', and 211c' are made incident, via the ocular optical system 207, into a pupil 213 of an observer's eye 208. On a retina 214 of the eye 208, images 215a, 215b, and 215c corresponding to condensing points 212a, 212b, and 212c on the reflecting member 105 are formed.

As a result, the observer can take notice, via the ocular optical system 207, a two-dimensional full-color scanned image formed on the reflecting member 205.

In the present embodiment, as shown in FIG. 6, beam scanning by the scanning optics 240 is performed from an oblique direction with respect to the reflecting member 205. Furthermore, the reflecting member 205, on the surface (reflecting surface) of which the two-dimensional image is formed, has a curvature.

Figure 7:
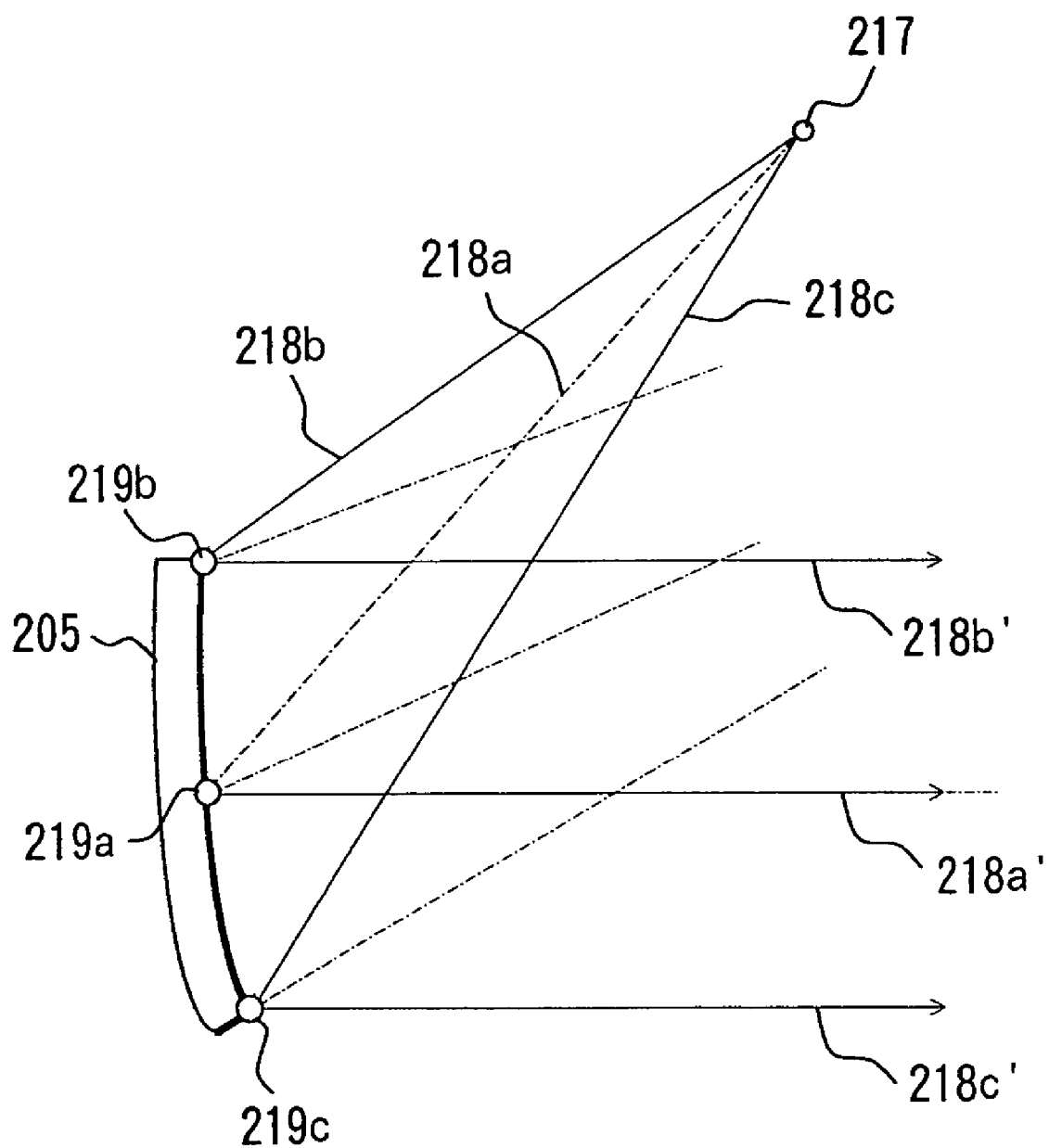
FIG. 7 is a diagram showing deflection characteristics of a reflecting member of the scanning type image display optical system shown in FIG. 6.

In FIG. 7, deflection characteristics of the reflecting member 205 are shown in terms of a section thereof. Rays 218a, 218b, and 218c denote principal rays of beam scanned by the optical scanning unit 203 at certain times, respectively. Herein, the principal rays 218a, 218b, and 218c are rays that have been emitted from an apparent scanning point 217.

Owing to a condensing action of the second optical system 204 (unillustrated in FIG. 7), the beams including the respective principal rays 218a, 218b, and 218c form condensing points 219a, 219b, and 219c substantially on the reflecting surface (or in the vicinity of the reflecting surface) of the reflecting member 205 and are reflected by the reflecting member 205 and deflected so as to become reflected beams including rays 218a', 218b' and 218c', respectively.

The respective points on the reflecting surface of the reflecting member 205 have an action to deflect the beams so that the principal rays 218a', 218b' and 218c' reflected on the reflecting member 205 become approximately parallel to each other and are made incident into the ocular optical system 207 (unillustrated in FIG. 7).

In detail, a curvature of the reflecting member 205 has been set so that the directions of normal lines (shown by alternate long and short dash lines) of the reflecting surface at the respective points differ from each other.

Figure 8:
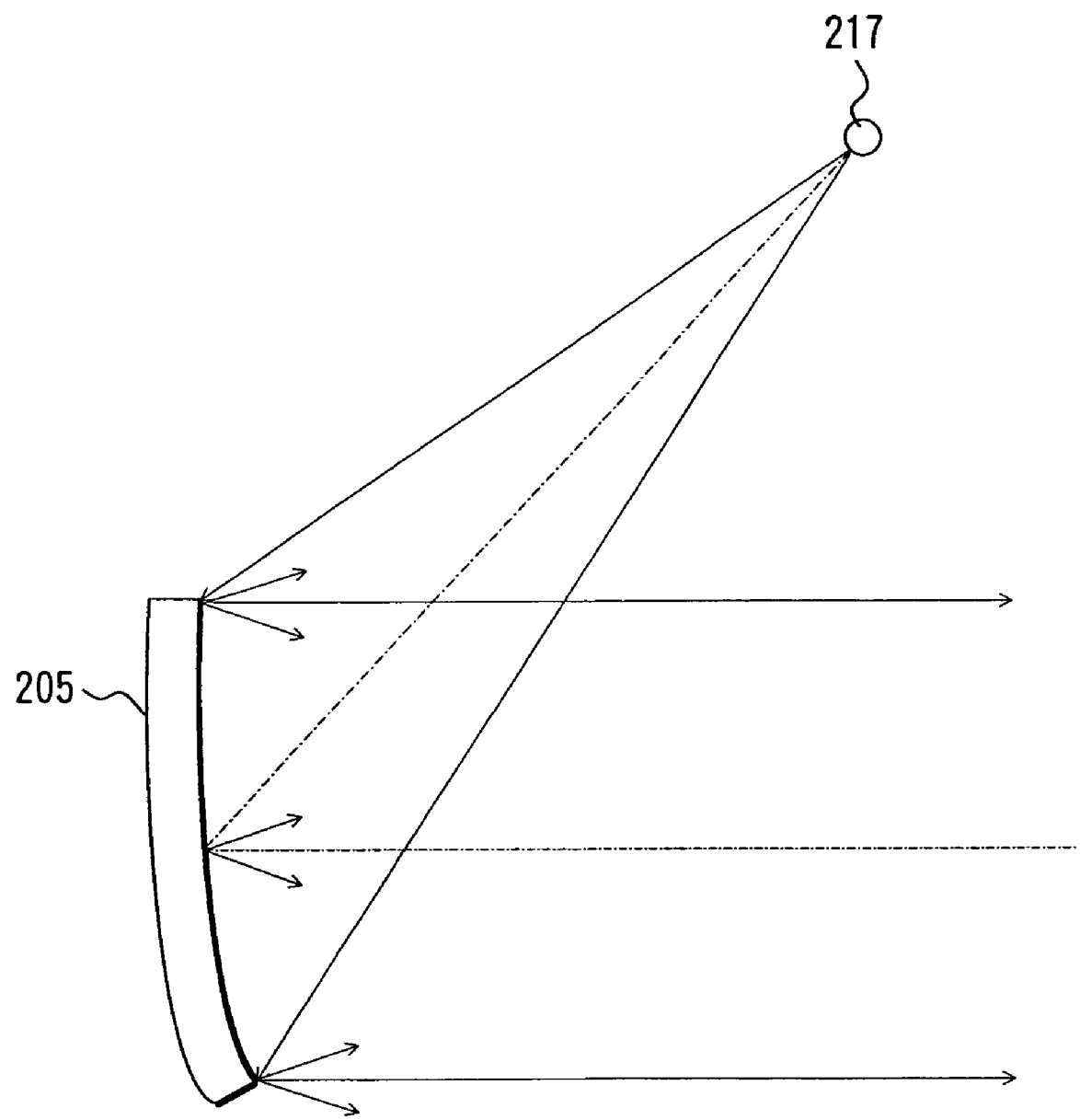
FIG. 8 is a diagram showing diffusion characteristics of the reflecting member shown in FIG. 7.

Furthermore, as shown in FIG. 8, similar to the embodiment shown in FIG. 1 through FIG. 5, a diffusing action is provided for the reflecting surface of the reflecting member 205, whereby the diameter of an exit pupil formed by the ocular optical system 207 is expanded.

Expression of the diffusing action on the reflecting member 205 can be realized by a diffusing structure having a minute uneven shape, a diffraction grating structure or the like. Even if a diffusing action is provided for the reflecting member 205, since scanning beam is condensed substantially on the reflecting surface of the reflecting member 205, little deterioration in resolution occurs.

According to the construction as in the above, by folding the optical path by the reflecting member 205, an image display optical system which is, while being a scanning type, small in size, moreover, can expand a pupil, and furthermore, has high resolution can be realized.

Herein, in the present embodiment, a description has been given for a case where a curvature is provided for the reflecting surface of the reflecting member 205, and the deflecting (reflecting) direction of incident beam from the optical scanning unit 203 is controlled to become a direction toward an ocular optical system 207, however, similar to the embodiment shown in FIG. 1 through FIG. 5, multiple minute reflecting plates may be formed on the reflecting member.

In addition, a member having the same deflection characteristics as those of minute reflecting plates, for example, a reflective hologram may be used.

In addition, as the optical scanning unit, an optical scanning unit which is the same in construction as ones mentioned as prior arts, a polygon mirror, a galvano mirror or the like can be used.

Figure 9:
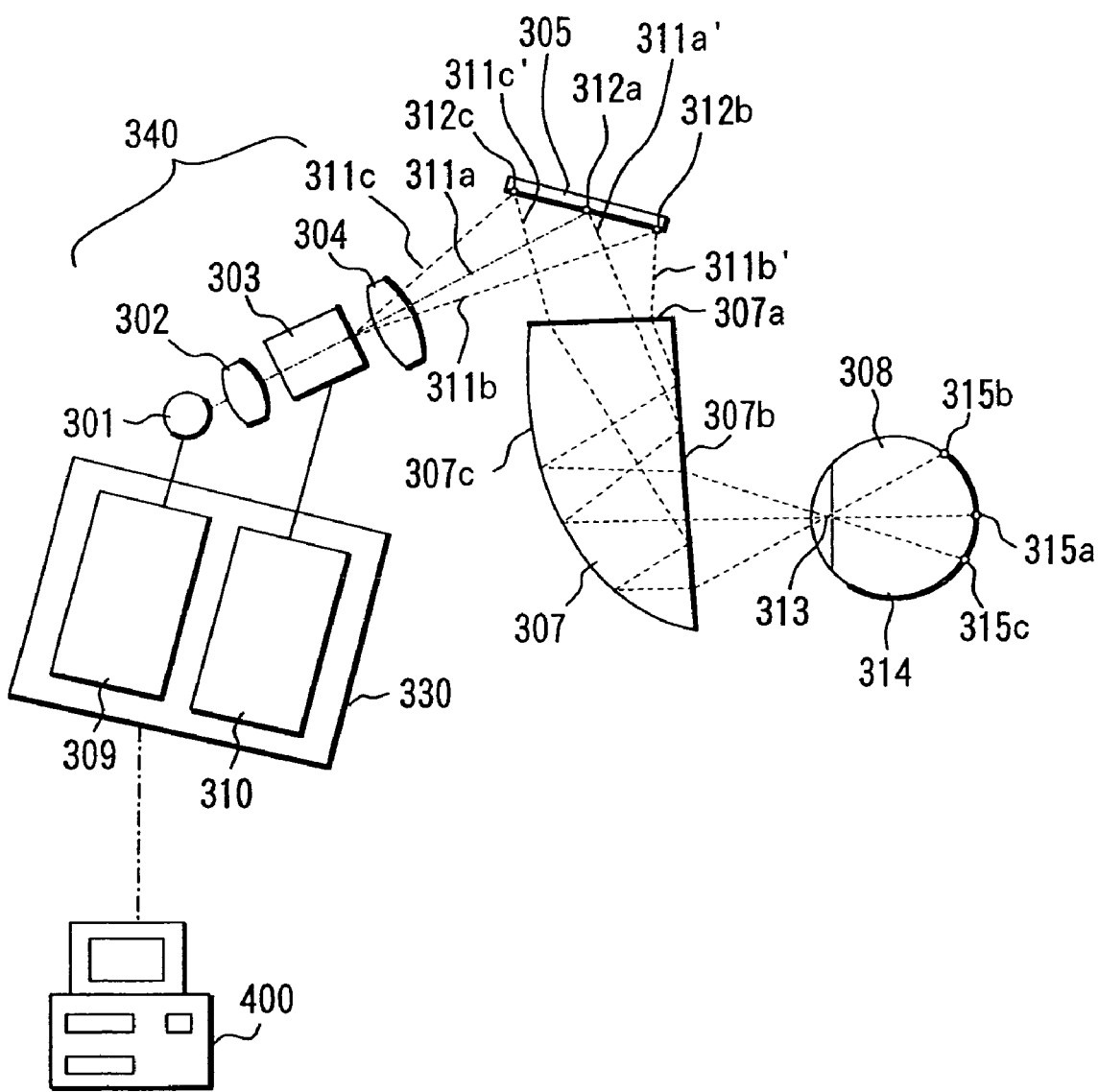
FIG. 9 is a diagram showing a construction of a scanning type image display optical system of an HMD as still another embodiment of the present invention.

FIG. 9 shows a sectional view of a scanning type image display optical system used in a head mounted display (a scanning image display apparatus) as still another embodiment of the present invention.

In the present embodiment, in place of the ocular optical system as a co-axial system used in the embodiment shown in FIG. 1 through FIG. 5, an ocular optical system employing an eccentric optical system called, for example, a free-form-surface prism is employed. Techniques for such a free-form surface, etc., have been disclosed in Japanese Laid-Open Patent Publication No. Hei-10-221638, etc.

The basic construction of the embodiment is the same as that of the embodiment shown in FIG. 1 through FIG. 5, wherein by scanning condensing points by an optical scanning unit, an image is formed on a reflecting member, and this image is observed by an observer via an ocular optical system.

In FIG. 9, a light source 301 is connected to a light source control circuit 309 and modulates an emitting beam in response to an image signal as a base of an image to be displayed. The beam to be emitted from the light source 301 is made incident into an optical scanning unit 303 via a first optical system 302.

Similar to the embodiment shown in FIG. 1 through FIG. 5, in the light source control circuit 309, an image signal from an image providing apparatus 400 is inputted, and the light source control circuit 309 drives the light source 301 in response to the image signal and causes the light source 301 to emit a modulated beam. Namely, in the present embodiment, a beam to be emitted from the light source 301 is directly modulated.

The optical scanning unit 303 is connected to a scanning control circuit 310 and is controlled synchronously with the light source 301. This optical scanning unit 303 is capable of deflecting the incident beam into the two-dimensional direction. The light source control circuit '309 and the scanning control circuit 310 compose a control part 330.

In the drawing, 311a, 311b, and 311c denote examples of beams scanned by the optical scanning unit 303, which are condensed at respective arrival points 312a, 312b, and 312c on a reflecting member 305 via a second optical system 304. The light source 301, the first and the second optical systems 302 and 304, and the optical scanning unit 303 compose a scanning optics 340.

By causing the light source 301 to emit a modulated beam, a two-dimensional image is formed on the surface (on multiple minute reflecting plates) of a reflecting member 305, which has been constructed similarly to the reflecting member 105 of the embodiment shown in FIG. 1 through FIG. 5.

The reflecting member 305 reflects incident beams 311a, 311b, and 311c in the directions shown with 311a', 311b', and 311c'. The reflected beams are made incident, via the ocular optical system 307, into a pupil 313 of an observer's eye 308. The beams made incident into the pupil 313 form, on a retina 314 of the eye 308, images 315a, 315b, and 315c corresponding to condensing points 312a, 312b, and 312c on the reflecting member 305. As a result, the observer can observe, via the ocular optical system 307, a two-dimensional scan image formed on the reflecting member 305.

In the present embodiment, as shown in FIG. 9, beam scanning by the optical scanning unit 303 is performed from an oblique direction with respect to the reflecting member 305.

In terms of the reflecting member 305, the directions of normal lines of the respective minute reflecting plates have been set so that the reflected beams 311a', 311b', and 311c' are appropriately made incident into the ocular optical system 307. In short, the directions of normal lines of the reflecting surfaces of the minute reflecting plates differ depending on the positions of the minute reflecting plates on the reflecting member 305.

Furthermore, similar to the embodiment shown in FIG. 1 through FIG. 5, the reflecting surface (reflecting surfaces of minute reflecting plates) of the reflecting member 305 has a diffusing action so that the diameter of an exit pupil of the ocular optical system 307 can be expanded. Even if a diffusing action is given to the reflecting member 305, since a scanned is condensed substantially on the reflecting surface of the reflecting member 305, little deterioration in resolution occurs.

Herein, the ocular optical system 307 will be briefly explained. The ocular optical system is constituted by a prism member 307 which is composed of three free-form surfaces (or rotationally asymmetric surfaces including not more than one symmetric plane) as first through third surfaces 307a–307c.

When the beam 311a' which has been reflected on the reflecting member 305 is taken as an example, this reflected beam 311a' is made incident into the prism member 307 from the first surface 307a. Furthermore, the reflected beam 311a' proceeds inside the prism member 307, substantially totally reflects on the second surface 307b, and proceeds toward the third surface 307c. Then, the reflected beam 311a' reflects on the third surface 307c, proceeds again toward the second surface 307b, and then transmits through the second surface 307b, and is emitted from the prism member 307.

This emitted beam is led to the pupil 313, whereby the observer can observe a two-dimensional image formed on the reflecting member 305.

As in the present embodiment, by constructing the first through third surfaces 307a–307c, which are optical surfaces composing the prism member (the ocular optical system) 307, with free-form surfaces (rotationally asymmetric surfaces), decentering aberration and the like can be corrected, thus it becomes possible to allow the observer to view a satisfactory image.

According to the construction as in the above, by folding the optical path by the reflecting member 305, an image display optical system which is, while being a scanning type, small in size, moreover, can expand a pupil, and furthermore, has high resolution can be realized.

Herein, in the present embodiment, a description has been given for a case where the reflecting member 305 having minute reflecting structures is used, however, a reflective hologram or the like may be used.

In addition, as the optical scanning unit, an optical scanning unit which is the same in construction as ones mentioned as prior arts, a polygon mirror, a galvano mirror or the like can be used.

Furthermore, in the present embodiment, a description has been given for a case where a single light source is provided, however, a plurality of light sources may be provided, and furthermore, light sources of a plurality of colors such as red, blue, and green may also be used so that a color image can be displayed.

In addition, in the above respective embodiments, descriptions have been given for cases where a beam to be emitted from the light source is directly modulated, however, a light flux from the light source may be modulated by an optical modulator (for example, an image display element such as a liquid crystal panel) arranged in the optical path from the light source.

In addition, in the above respective embodiments, descriptions have been given for cases where the second optical system is inserted between the optical scanning unit and reflecting member, however, a function for condensing light onto the reflecting member may be provided for the first optical system. In this case, if distortion and the like of the two-dimensional scan image formed on the reflecting member is corrected by optical corrections by the second optical system and control of the light source and the like, an optical system for expanding a virtual image on a prior optical modulator such as a liquid crystal panel can be used as an ocular optical system without modification.

As described above, according to the above respective embodiments, a two-dimensional image is formed on the reflecting surface of a reflecting member by beam (light) scanning by the optical scanning unit, and this two-dimensional image formed on the reflecting surface is observed through the ocular optical system, therefore, by folding the optical path by the reflecting member, the entire image display optical system can be downsized, although being a scanning type.

Moreover, irrespective of the beam incident positions upon the reflecting surface of the reflecting member from the optical scanning unit, the principal reflecting direction of beam is a direction toward the ocular optical system, therefore, utilization efficiency of light is high and it becomes possible to observe a bright image.

Furthermore, by providing a diffusing action for the reflecting surface, the diameter of the exit pupil of an observation optical system can also be expanded.

While preferred embodiments have been described, it is to be understood that modification and variation of the present invention may be made without departing from the sprit or scope of the following claims.

What is claimed is:

1. A scanning type image display optical system comprising:
    a reflecting surface;
    an optical scanning unit which forms a two-dimensional image on said reflecting surface by light scanning; and
    an ocular optical system which leads light directly reflected from said reflecting surface to an observer,
    wherein said reflecting surface has a curvature and is disposed between said optical scanning unit and said ocular optical system in an optical path, and directions of normal lines of said reflecting surface differ depending on the positions of said reflecting surface so that the principal reflecting direction of light made incident upon said reflecting surface from said optical scanning unit becomes a direction toward said ocular optical system irrespective of the incident positions on said reflecting surface.

2. The scanning type image display optical system according to claim 1 further comprising:
    a light source which emits modulated light in response to an image signal and the emitted light is made incident upon said optical scanning unit.

3. The scanning type image display optical system according to claim 1, wherein the beam scanned by said optical scanning unit is condensed at respective arrival points on said reflecting surface via an optical system.

4. A scanning type image display apparatus comprising;
    a scanning type image display optical system according to claim 1, and
    a drive circuit which drives said optical scanning unit.

5. An image display system comprising:
    an image display apparatus according to claim 4, and
    an image providing apparatus which provides image information for displaying a two-dimensional image by light scanning of said optical scanning unit, to said image display apparatus.

* * * * *